United States Patent
Da et al.

(10) Patent No.: US 7,499,710 B2
(45) Date of Patent: Mar. 3, 2009

(54) INTEGRITY MONITORING FOR GEO-LOCATION SYSTEMS

(75) Inventors: Ren Da, Warren, NJ (US); Robert Ellis Richton, Madison, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1541 days.

(21) Appl. No.: 09/942,420

(22) Filed: Aug. 30, 2001

(65) Prior Publication Data

US 2003/0054759 A1 Mar. 20, 2003

(51) Int. Cl.
*H04Q 7/20* (2006.01)
(52) U.S. Cl. .............. 455/456.1; 455/456.3; 455/67.11; 455/517
(58) Field of Classification Search .............. 455/456.6, 455/457, 456.1, 427, 429, 430, 9, 11.1, 12.1, 455/13, 2, 67.16, 456.5, 517, 414.1–2, 456.3, 455/422.1, 435, 506, 507, 13.1, 67.11, 13.2, 455/552.1; 701/214, 207; 342/357.53, 357.15, 342/357.06, 357.02, 357.03
See application file for complete search history.

(56) References Cited

U.S. PATENT DOCUMENTS

| | | | |
|---|---|---|---|
| 6,084,544 A * | 7/2000 | Camp, Jr. ............... | 342/357.15 |
| 6,289,280 B1 * | 9/2001 | Fernandez-Corbaton et al. .......................... | 701/214 |
| 6,320,536 B1 * | 11/2001 | Sasaki .................... | 342/357.15 |
| 6,323,803 B1 * | 11/2001 | Jolley et al. ............ | 342/357.03 |
| 6,417,800 B1 * | 7/2002 | Valio et al. ............. | 342/357.02 |
| 6,420,999 B1 * | 7/2002 | Vayanos ................. | 342/357.03 |
| 6,433,733 B2 * | 8/2002 | Syrjarinne et al. ..... | 342/357.08 |
| 6,636,740 B1 * | 10/2003 | Ramesh .................. | 455/456.1 |
| 6,707,420 B2 * | 3/2004 | Vayanos et al. ........ | 342/357.06 |
| 2002/0055817 A1 * | 5/2002 | Chou .................... | 342/357.06 |
| 2002/0097181 A1 * | 7/2002 | Chou et al. ............ | 342/357.06 |
| 2003/0008669 A1 * | 1/2003 | Stein et al. .................. | 455/456 |

* cited by examiner

*Primary Examiner*—John J Lee

(57) ABSTRACT

Weighted ridge regression (WRR) processing is applied to three or more distance measurements to determine the location of a terminal. For example, in an integrated satellite-based navigation system/wireless network, the location of a mobile unit can be determined by applying WRR processing to at least three distance measurements, where one or more of the distance measurements are satellite-based distance measurements (e.g., GPS pseudorange measurements) and one or more are wireless network-based distance measurements (e.g., round-trip delay or pilot phase offset measurements). WRR processing provides improved accuracy in the determination of mobile unit position over conventional least mean square techniques.

10 Claims, 4 Drawing Sheets

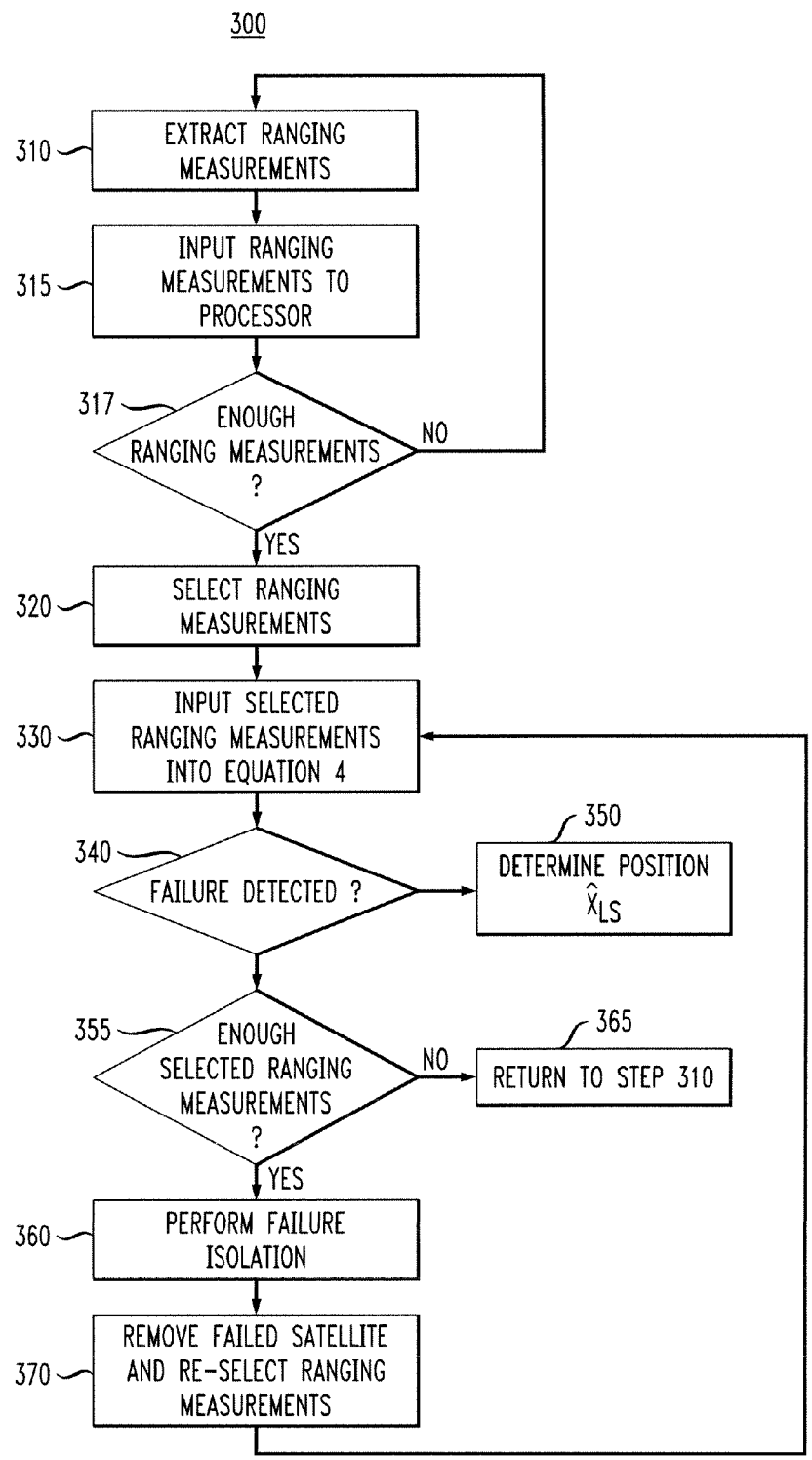

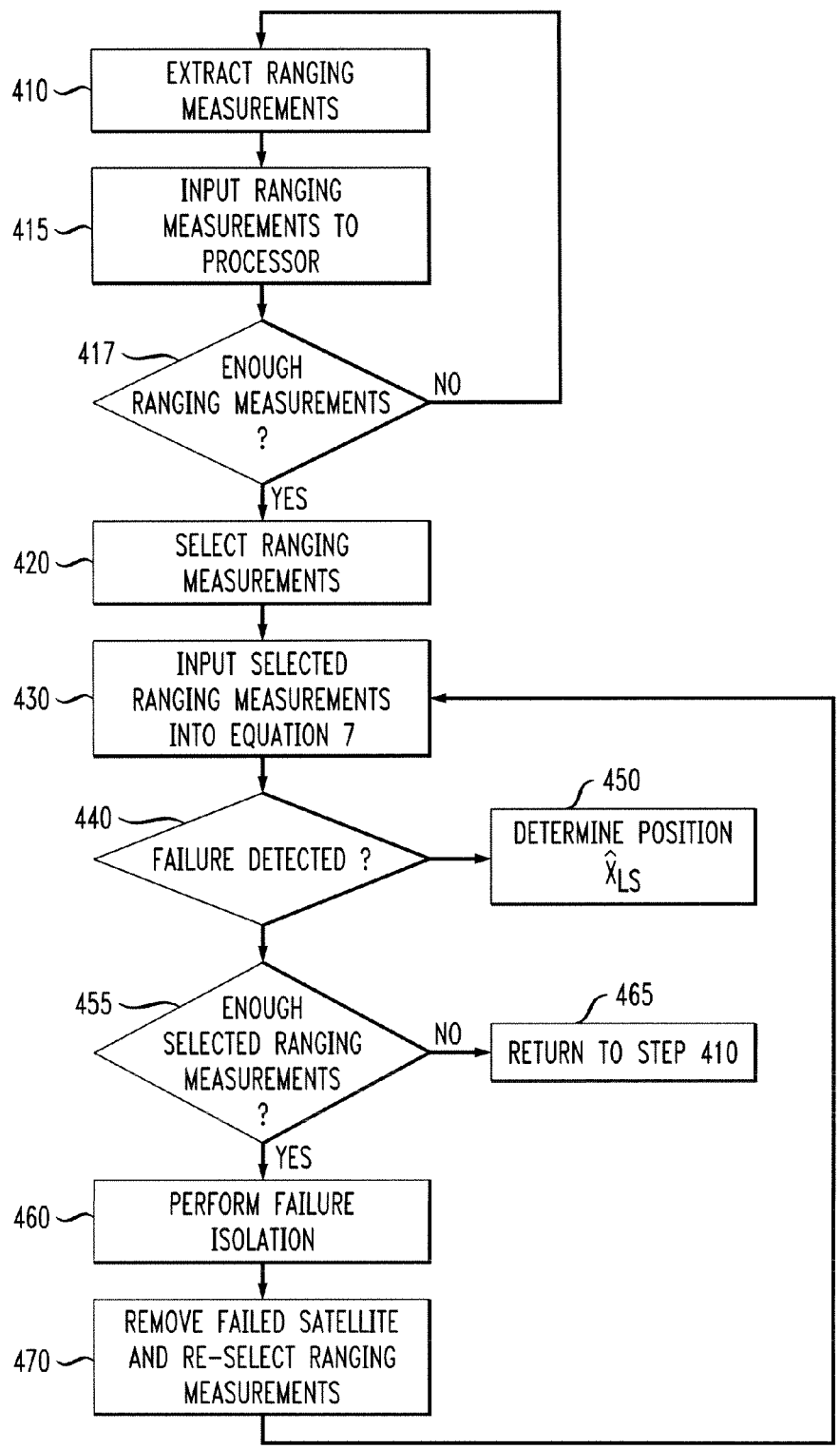

INTEGRITY MONITORING FOR GEO-LOCATION SYSTEMS

FIELD OF THE INVENTION

The present invention relates generally to wireless communication systems and, in particular, to wireless location systems.

BACKGROUND OF THE RELATED ART

Satellite-based navigational systems provide accurate, two or three dimensional position information to worldwide users. FIG. 1 depicts a well-known satellite-based navigational system referred to as Global Positioning System (GPS) 10. GPS 10 comprises a plurality of satellites 12-$j$ and at least one GPS receiver 14. Each satellite 12-$j$ orbits earth at a known speed $v_j$ and is a known distance apart from other satellites 12-$j$. Each satellite 12-$j$ transmits a GPS signal 11-$j$ which includes a carrier signal with a known frequency f modulated using a unique pseudo-random noise (PN-j) code and navigational data (ND-j) associated with the particular satellite 12-$j$, wherein the PN-j code includes a unique sequence of PN chips and navigation data ND-j includes a satellite identifier, timing information and orbital data, such as elevation angle $\alpha_j$ and azimuth angle $\phi_j$.

GPS receiver 14 comprises an antenna 15 for receiving GPS signals 11-$j$, a plurality of correlators 16-$k$ for detecting GPS signals 11-$j$ and a processor 17 having software for determining a position using pseudoranges and the navigation data ND-j associated with the detected GPS signals 11-$j$. GPS receiver 14 detects GPS signals 11-$j$ via PN-j codes using a correlation process in which correlators 16-$k$ search for PN-j codes in a carrier frequency dimension and a code phase dimension. Such correlation process is implemented as a real-time multiplication of a phase shifted replicated PN-j codes modulated onto a replicated carrier signal with received GPS signals 11-$j$, followed by an integration and dump process.

Upon detecting GPS signals 11-$j$, GPS receiver 14 extracts ranging information from the detected GPS signals 11-$j$ in the form of pseudoranges or PN phase offset measurements, wherein ranging information indicates a range or distance between a transmitter source, i.e., satellite 12-$j$, and a receiver, i.e., GPS receiver 14. The pseudorange measurements are subsequently used to determine time differences for satellites 12-$j$ indicating times required for GPS signals 11-$j$ to travel from satellites 12-$j$ to GPS receiver 14. Such time differences, along with other navigational data indicated in GPS signals 11-$j$, are used to determine the position of GPS receiver 14, as is well known in the art. Note that a two dimensional position, i.e., latitude and longitude, of GPS receiver 14 can be determined if GPS receiver 14 can detect GPS signals 11-$j$ transmitted from at least three satellites 12-$j$, and a three dimensional position, i.e., latitude, longitude and altitude, of GPS receiver 14 can be determined if GPS receiver 14 can detect GPS signals 11-$j$ transmitted from at least four satellites 12-$j$.

The accuracy of the position being determined for GPS receiver 14 depends on the quality of the pseudorange measurements. The quality of the pseudorange measurements is affected by signal strengths, multipaths, noise caused by the environment or GPS receiver components, etc. Good quality pseudorange measurements result in high accuracy GPS receiver 14 positioning solutions. By contrast, poor quality PN phase offset measurements, such as outliers, result in GPS receiver 14 positioning solutions with large errors.

Integrity monitoring techniques are used to detect and, if possible, remove poor quality pseudorange measurements used in positioning solutions such that high accuracy GPS receiver 14 positioning solutions may be obtained. The function of integrity monitoring is to perform failure detection and/or failure isolation. Failure detection is a technique for determining the existence of a failed satellite, i.e., satellite associated with a poor quality pseudorange measurement used in a positioning solution. In order to perform failure detection in two dimensional positioning solutions, GPS receiver 14 needs to be able to detect at least four GPS signals 11-$j$. In order to perform failure detection in three dimensional positioning solutions, GPS receiver 14 needs to be able to detect at least five GPS signals 11-$j$.

Failure isolation is a technique for identifying the failed satellite (or poor quality pseudorange measurement). In order to perform failure isolation in two dimensional positioning solutions, GPS receiver 14 needs to be able to detect at least five GPS signals 11-$j$. In order to perform failure isolation in three dimensional positioning solutions, GPS receiver 14 needs to be able to detect at least six GPS signals 11-$j$. Once failure isolation is successfully performed, the ranging information associated with the failed satellite can be removed from positioning solutions.

Integrity monitoring techniques include the well-known parity method, ranging comparison method and least squares residuals method. All three methods are snapshot schemes that assume redundant ranging information or measurements, i.e., the number of ranging information or measurements is more than required for determining a positioning solution, are available at a given sample point in time. All three methods have been proven to provide identical results with respect to failure detection. The parity method, however, has been proven to be further useful in performing failure isolation. For ease of discussion, integrity monitoring will be discussed herein with reference to the parity method. This should not be construed to limit the present invention in any manner.

The basic measurement relationships for failure detection and isolation can be generally described by the following well-known equation $$y = Hx + e \qquad \text{equation 1}$$

where y is a n×1 measurement vector representing differences between actual measured pseudoranges and predicted pseudoranges based on a nominal position of GPS receiver 14 and a clock bias, n is the number of ranging measurements, and H is a n×m known predictor matrix arrived at by linearizing about the nominal position and a clock bias. The term x is a m×1 vector which typically includes components of true position deviation from the nominal position plus a derivation of the clock bias, where m is the number of unknown variables in vector x to be solved. The term e is a n×1 measurement error vector due to receiver noise, vagaries in propagation, imprecise knowledge of satellite position, satellite clock error, etc. For the integrity monitoring of a satellite navigation system, it is commonly assumed that e is a zero mean with n×n covariance matrix $R = \sigma^2 I$, where I is a n×n identity matrix and $\sigma^2$ is a variance associated with each element of the error vector e.

In the parity method, a linear transformation on the measurement vector y results in the following equation $$\begin{bmatrix} \hat{x}_{LS} \\ p \end{bmatrix} = \begin{bmatrix} (H^T H)^{-1} H^T \\ P \end{bmatrix} y \quad \text{equation 2}$$

where the upper portion yields a least squares solution $\hat{x}_{LS}$ and the lower portion yields a parity vector p. Least squares solution $\hat{x}_{LS}$ indicates least squares components of true position deviation from the nominal position and derivation of the clock bias. Parity vector p is the result of operating on measurement vector y with a special (n−m)×n matrix P, wherein matrix P has rows unity in magnitude and mutually orthogonal to each other and to the columns of predictor matrix H. The method of determining matrix P is well-known and described in "Matrix Computation," Second Edition, authored by G. H. Golub and C. F. Van Loan and published by The John Hopkins University Press.

Under the assumption of equation 1, i.e., e is a zero mean with a n×1 measurement error vector, failure detection is a simple scalar which obeys a chi-square distribution with a freedom of n−m. Specifically, failure detection utilizes a failure decision rule, wherein the failure decision rule involves calculating a decision scalar $d = p^T p$, and comparing the decision scalar d against a predetermined failure detection threshold value. If the decision scalar d is greater than the failure detection threshold, then failure is detected and declared. Otherwise, failure is not detected and no failure is declared. Note that n−m must be larger or equal to one for failure detection to be possible. Thus, the number of redundant ranging measurements n must be at least four or five in order to perform failure detection in two or three dimensional positioning solutions, respectively.

Parity vector p also provides a geometric perspective useful in failure isolation because the direction indicated by parity vector p can be used to identify the failed satellite. For example, assume there are total 6 satellite measurements and 4 unknown variables in vector x, i.e., n=6 and m=4. Assume also a failure happens on a k-th satellite 12-j, which causes an error b in the measurement of the k-th satellite 12-j, where b is much larger than normal measurement noise. The matrix P is then a 2×6 matrix.

$$P = \begin{bmatrix} p_{11} & \cdots & p_{1j} & \cdots & p_{16} \\ p_{21} & \cdots & p_{2j} & \cdots & p_{26} \end{bmatrix} \quad \text{equation 3a}$$

Since b is much larger than normal measurement noise, the measurement error vector e can be approximated by the following equation.

$$e = \begin{bmatrix} e_1 \\ \vdots \\ e_j + b \\ \vdots \\ e_n \end{bmatrix} \approx \begin{bmatrix} 0 \\ \vdots \\ b \\ \vdots \\ 0 \end{bmatrix} \quad \text{equation 3b}$$

Then, the resultant parity vector p is $$p = Py = P(Hx + e) = Pe \approx \begin{bmatrix} p_{1j} \\ p_{2j} \end{bmatrix} \quad \text{equation 3c}$$

where $p_{1j}$ and $p_{2j}$ denotes elements of matrix P. Equation 3c shows that by ignoring the normal measurement noise, parity vector p induced by the error b on satellite 12-j must lie along a line whose slope is $p_{1j}/p_{2j}$. Each satellite 12-j is associated with its own characteristic bias line, with a slope determined by the elements of the respective column vector of P. The failed satellite is identified as the satellite with a characteristic bias line that lies along parity vector p. Note that n−m needs to be greater than or equal to two in order for parity vector p to be a vector. If p is not a vector, failure isolation cannot be performed.

When GPS receiver 14 does not have enough redundant ranging measurements available, integrity monitoring can not be performed. For example, GPS receiver 14 may not have a sufficient number of redundant measurements when GPS receiver 14 is directly obstructed from satellites 12-j by a building. In this example, the problem may be exacerbated because the number of poor quality pseudorange measurements by GPS receiver 14 would probably increase, which would further necessitate the need for integrity monitoring. Accordingly, there exists a need to perform integrity monitoring when GPS receiver 14 lacks redundant ranging measurements.

SUMMARY OF THE INVENTION

The present invention is a method for performing integrity monitoring in the absence of redundant ranging measurements from a first ranging source type by using ranging measurements from a second ranging source type, wherein a ranging source type corresponds to a class of ranging sources and a ranging source is a transmitter source emitting a signal that can be used by a receiver to obtain ranging information indicating a range or distance between the transmitter source and receiver. In an embodiment of the present invention, weighted ridge regression techniques are used enhance integrity monitoring.

BRIEF DESCRIPTION OF THE DRAWINGS

The features, aspects, and advantages of the present invention will become better understood with regard to the following description, appended claims, and accompanying drawings where

FIG. 3 depicts a flowchart illustrating a method of integrity monitoring in accordance with one embodiment of the present invention; and FIG. 4 depicts a flowchart illustrating a method of integrity monitoring in accordance with a weighted ridge regression embodiment of the present invention.

DETAILED DESCRIPTION

Figure 1:
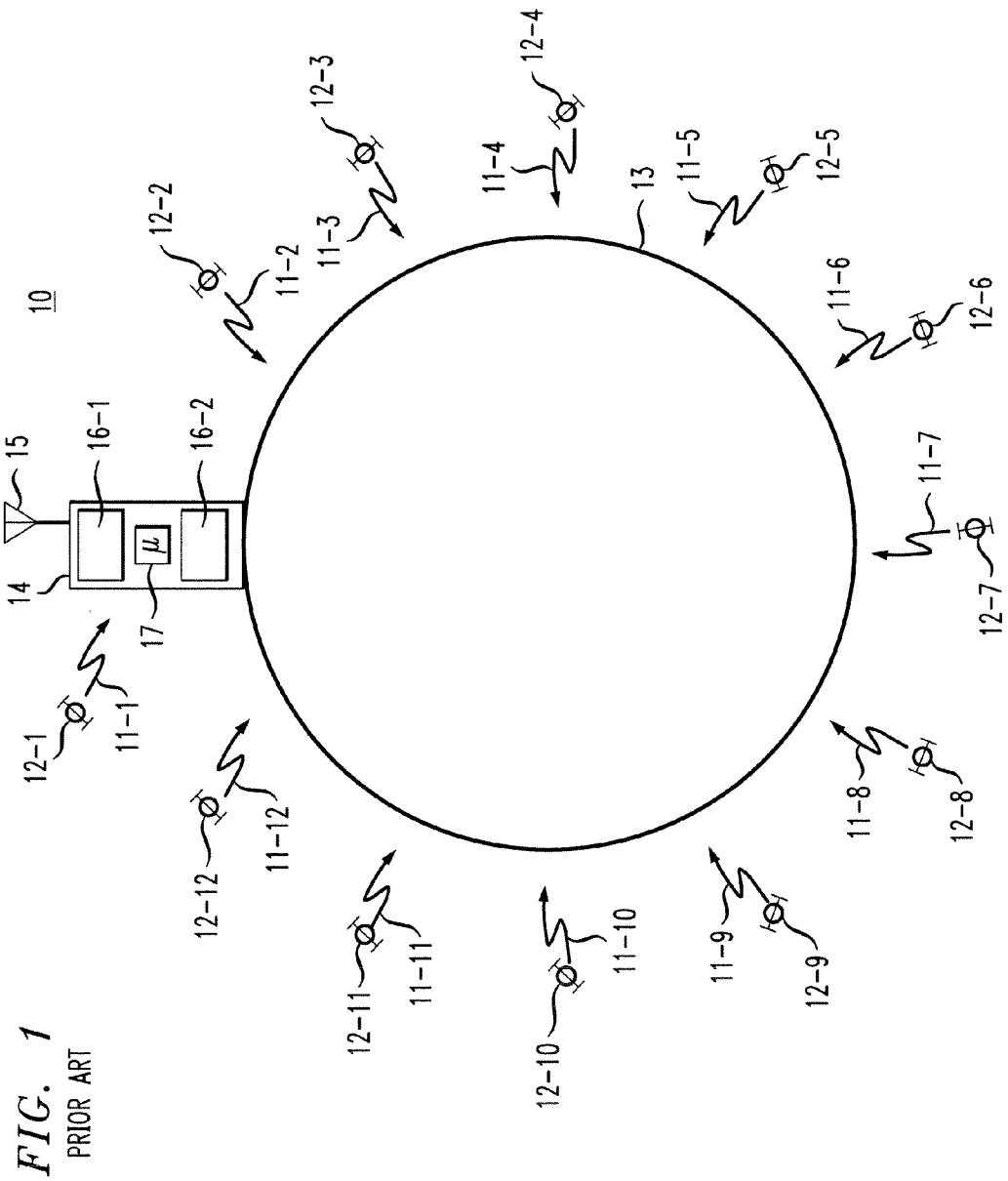
FIG. 1 depicts a prior art satellite-based navigational system referred to as Global Positioning System (GPS)
Figure 2:
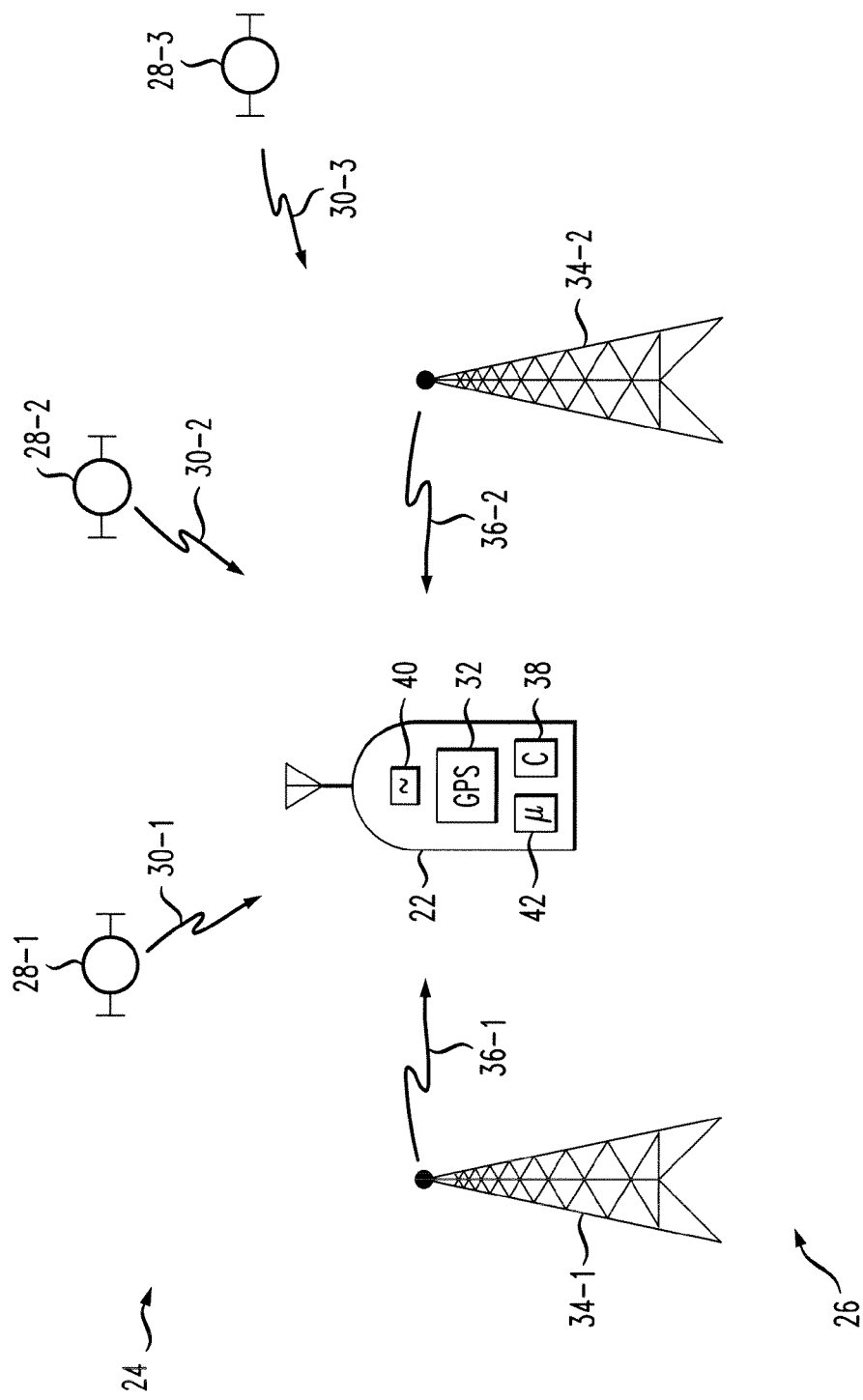
FIG. 2 depicts an embodiment of a geo-location architecture comprising of a wireless terminal and ranging sources belonging to two different ranging source types in accordance with one embodiment of the present invention.

The present invention is a method for performing integrity monitoring of a first ranging source type using a second ranging source type. FIG. 2 depicts an embodiment of a geo-location architecture 20 comprising of a wireless terminal 22 and ranging sources belonging to two different ranging source types, wherein a ranging source type corresponds to a class of ranging sources and a ranging source is a transmitter source emitting a signal that can be used by wireless terminal 22 (or some other entity, including the ranging source) to obtain ranging information indicating a range or distance between the transmitter source and wireless terminal 22. In this embodiment, the two ranging source types are a Global Positioning System (GPS) 24 and a land based wireless communication network 26. Ranging information obtained from wireless communication network 26 will be used to monitor the integrity of ranging information obtained from GPS 24, and vice-versa. It should be understood that the ranging sources may be a type other than GPS 24 and wireless communication network 26. For example, the ranging source type may be another satellite system capable of providing ranging information, another wireless communication network based on a same or different technology, or some other terrestrial network. It should also be understood that a third ranging source may also be used to monitor the integrity of the first and/or second ranging source type.

GPS 24 comprises a plurality of satellites 28-j, i.e., ranging source. Each satellite 28-j orbits earth at a known speed $v_j$ and is a known distance apart from other satellites 28-j. Each satellite 28-j transmits a GPS signal 30-j which includes a carrier signal with a known frequency f modulated using a unique pseudo-random noise (PN-j) code and navigational data (ND-j) associated with the particular satellite 28-j, wherein the PN-j code includes a unique sequence of PN chips and navigation data ND-j includes a satellite identifier, timing information and orbital data, such as elevation angle $\alpha_e$ and azimuth angle $\phi_j$.

Ranging information is indicated in GPS signals 30j to wireless terminal 22 in the form of pseudorange or PN phase offset measurements. Wireless terminal 22 includes a GPS receiver 32 for measuring pseudoranges or PN phase offsets in detected GPS signals 30j, as is well-known in the art.

Wireless communication network 26 comprises a plurality of base stations 34-p, i.e., ranging source. Each base station 34-p transmits a signal 36-p that can be used by wireless terminal 22 or, with the assistance of wireless terminal 22, base station 34-p to obtain ranging information (e.g., to obtain round trip delay information). The ranging information can be indicated to wireless terminal 22 in a variety of forms. In a first embodiment, ranging information is indicated in the form pilot phase offsets, which correspond to measurements of code phases in pilot signals. In this embodiment, base stations 34-p are time synchronized and the pilot signals are transmitted at some known time relative to each other. For example, transmission of each pilot signal begins at the same time or at some known time apart. The transmitted pilot signals are detected and the pilot phase offsets are measured by wireless terminal 22, wherein the pilot phase offset measurements are used to obtain the ranging information, as is well-known in the art.

In a second embodiment, ranging information is indicated in the form of signal strength. For example, base stations 34-p transmit signals 36-p, such as pilot signals, at a known transmission power. Signals 36-p are received and signal strengths measured by wireless terminal 22. Based on the known transmission power and the signal strength measurements, distances between base stations 34-p and wireless terminal 22 can be estimated, as is well-known in the art.

In a third embodiment, ranging information is indicated in the form of round trip delay (RTD) or one way delay (OWD) between base station 34-p and wireless terminal 22. In this embodiment, base stations 34-p may or may not be time synchronized with respect to each other and/or wireless terminal 22. The manners in which RTD and OWD may be determined are well-known in the art.

In a fourth embodiment, ranging information is indicated in the form of enhanced observed time difference (E-OTD). In E-OTD, unsynchronized base stations transmit synchronization and/or dummy bursts which can be used to obtain ranging information between the unsynchronized base stations and wireless terminal 22.

Wireless terminal 22 comprises, along with GPS receiver 32, a correlator 38, an oscillator 40 and/or a processor 42 with appropriate software for determining ranging information indicated in signal 36-p and for performing integrity monitoring. In one embodiment, integrity monitoring is performed using one of the following well-known techniques: ranging comparison; least square residuals; and parity. All three techniques are snapshot schemes that assume redundant ranging measurements, i.e., the number of ranging information or measurements is more than required for determining a positioning solution, are available at a given sample point in time. It has been proven that all three techniques provide identical results for failure detection. Among these techniques, the parity technique is preferred for failure isolation. For ease of discussion, the present invention will be described herein with respect to the parity method. It should not be construed to limit the present invention in any manner.

FIG. 3 depicts a flowchart 300 illustrating a method of integrity monitoring in accordance with one embodiment of the present invention. In step 310, wireless terminal 22 extracts a set of ranging measurements at a given sample point in time from signals 30-j and 36-p transmitted by satellites 28-j and base stations 34-p, respectively. In step 315, the extracted ranging measurements are provided as input to processor 42. In step 317, processor 42 determines if there are redundant ranging measurements sufficient to perform failure detection and/or isolation. If no, flowchart 300 return to step 310. If yes, flowchart continues to step 320.

In step 320, processor 42 selects redundant ranging measurements (from the set of extracted ranging measurements) to use in the determination of wireless terminal 22's position. If two dimensional positioning is being performed by wireless terminal 22, then at least five ranging measurements are selected. If three dimensional positioning is being performed, then at least six ranging measurements are selected. Note that, in step 320, it is assumed that both failure detection and failure isolation is being performed as parts of integrity monitoring. If only failure detection is being performed, then at least four and five ranging measurements are selected for two and three dimensional positioning, respectively. Flowchart 300 may include an additional step of determining how many ranging measurements to select prior to step 320. For example, it may be determined prior to step 320 to select only four measurements if there were only four ranging measurements in the set of extracted ranging measurements or if only failure detection was to be performed.

In a first embodiment, wireless terminal 22 selects all of the extracted ranging measurements for determining its position. In a second embodiment, wireless terminal 22 selects ranging measurements based on the ranging source type. For example, wireless terminal 22 selects only ranging measurements extracted from GPS signals 30-j, and not from base station signals 36-p, if there were enough ranging measurements extracted from GPS signals 30-j to perform integrity monitoring. In a third embodiment, wireless terminal 22 selects ranging measurements based on perceived or anticipated reliability of the ranging measurements. For example, ranging measurements extracted from base station signals 26-$p$ might be selected before ranging measurements extracted from GPS signals 30-$j$ if the signal strengths of base station signals 36-$p$ were stronger than the signal strengths of GPS signals 30-$j$. In a fourth embodiment, wireless terminal 22 selects ranging information from at least two different source types.

In step 330, the selected ranging measurements are inputted into the following equation to calculate least squares solution $\hat{x}_{LS}$ and parity vector p $$\begin{bmatrix} \hat{x}_{LS} \\ p \end{bmatrix} = \begin{bmatrix} (H^T H)^{-1} H^T \\ P \end{bmatrix} y \qquad \text{equation 4}$$

where $\hat{x}_{LS}$ is a m×1 vector which typically includes components of true position deviation from a nominal position and a clock bias, m is the number of unknown variables in vector $\hat{x}_{LS}$ to be solved, n is the number of ranging measurements, H is a n×m known predictor matrix arrived at by linearizing about a nominal position of wireless terminal 22 and a clock bias, and P is a special (n−m)×n matrix with rows unity in magnitude and mutually orthogonal to each other and to the columns of predictor matrix H. The method of determining matrix P is well-known and described in "Matrix Computation," Second Edition, authored by G. H. Golub and C. F. Van Loan and published by The John Hopkins University Press.

The term y represents a n×1 measurement vector representing differences between actual ranging measurements and predicted ranging measurements based on the nominal position and clock bias. Measurement vector y is represented by the following equation $$y = \begin{bmatrix} y_{\text{satellite\_12-}j} \\ y_{\text{base\_station\_34-}p} \end{bmatrix} = \begin{bmatrix} H_{\text{satellite\_12-}j} \\ H_{\text{base\_station\_34-}p} \end{bmatrix} x + \qquad \text{equation 5}$$

$$\begin{bmatrix} e_{\text{satellite\_12-}j} \\ e_{\text{base\_station\_34-}p} \end{bmatrix}$$

where e is a n×1 measurement error vector due to receiver noise, vagaries in propagation, imprecise knowledge of satellite position, satellite clock error, etc., and the subscripts satellite_12-$j$ and base_station_34-$p$ indicate the associated satellite 12-$j$ and base station 34-$p$ for measurement vector y, predictor matrix H and error vector e.

In step 340, failure detection is performed by checking if a decision scalar d is greater than a failure detection threshold value, where d=$p^T p$. If the decision scalar d is not greater than the failure detection threshold value, i.e., failure is not detected, in step 350, the least squares solution $\hat{x}_{LS}$ is outputted as the positioning solution of wireless terminal 22. Otherwise, failure is detected and, in step 355, it is determined whether there are enough selected ranging measurements to perform failure isolation. If there are enough selected ranging measurements, then flowchart 300 proceeds to step 360. Otherwise, flowchart 300 returns to step 310 via step 365.

In step 360, failure isolation is performed based on the following equation $$p = Py = Pe = \begin{bmatrix} p_{1j} \\ p_{2j} \end{bmatrix} b \qquad \text{equation 6}$$

where $p_{1j}$ and $p_{2j}$ denotes elements of P, e is a n×1 measurement error vector due to receiver noise, vagaries in propagation, imprecise knowledge of satellite position, satellite clock error, etc., and y is a n×1 measurement vector representing differences between actual measured pseudoranges and predicted ranges based on a nominal user position and clock bias. The failed satellite is isolated as the satellite with a characteristic bias line that lies along parity vector p.

In step 370, ranging measurements are re-selected to be used in determining a positioning solution and performing integrity monitoring. In re-selecting the ranging measurements, the ranging measurement associated with the failed satellite, if isolated in step 360, is removed from the group of ranging measurements in which the selection is to be made in step 370. In a first embodiment, the re-selected redundant ranging measurements includes the remaining ranging measurements, i.e., ranging measurements selected in step 320 less the ranging measurement associated with the failed satellite, and previously unselected ranging measurements. In a second embodiment, the re-selected ranging measurements includes only the remaining ranging measurements if the number of ranging measurements are sufficient to perform failure detection and/or failure isolation. In a third embodiment, all of the ranging measurements are re-selected from a group comprising of the remaining ranging measurements and previously unselected ranging measurements in a manner similar to step 320. Upon re-selecting the redundant ranging measurements, flowchart 300 returns to step 330.

Note that the present invention is described herein with integrity monitoring being performed at wireless terminal 22. It should be understood that ranging information obtained by wireless terminal 22 may also be transmitted to another entity, such as base stations 34-$p$, to have integrity monitoring performed.

In another embodiment, the present invention uses weighted ridge regression (WRR) techniques to account for different levels of error in ranging measurements related to the ranging source type, and for influences of bad geometric distribution. The principles of WRR is based on a weighing technique and a ridge regression estimation technique. Errors in the ranging information can vary depending on the ranging source type. For example, the errors in RTD, pilot phase offset, signal strength and E-OTD measurements are typically several times larger than PN phase offset measurements. The weighing technique of WRR gives proper weight to each of ranging measurements when determining a positioning solution.

Geometric distribution of wireless terminal 22, base stations 34-$p$ and satellites 28-$j$ differ with various environments. Bad geometric distribution is present when the positions of wireless terminal 22, base stations 34-$p$ and satellites 28-$j$ are located on approximately the same plane for three dimensional positioning or the same line for two dimensional positioning. In these situations, a position error mechanism known as geometric dilution of precision (GDOP) arises. GDOP depends solely on geometry. Position accuracy can be estimated as ranging accuracy multiplied by GDOP. Typically, variations in geometry are far greater than variations in ranging accuracy. When poor geometry or large GDOP is present, position accuracy is adversely affected severely when measurements are applied to position solutions by use of the well-known least mean squares (LMS) algorithm. The ridge regression estimation technique of WRR minimizes the influence of large GDOP to the mean square error of positioning solutions. Weighted ridge regression is described in more detail in Appendix A.

FIG. 4 depicts a flowchart 400 illustrating a method of integrity monitoring in accordance with a weighted ridge regression embodiment of the present invention. Steps 410 to 420 and steps 440 to 470 correspond to steps 310 to 320 and steps 340 to 370, respectively. Steps 430 differs from step 330 in that step 430 performs failure detection using the following equation $$\begin{bmatrix} \hat{x}_{WRR} \\ p \end{bmatrix} = \begin{bmatrix} (H^T R^{-1} H + kI)^{-1} R^{-T} \\ P \end{bmatrix} y \quad \text{equation 7}$$

where $\hat{x}_{WRR}$ is the weighted ridge regression solution and k is an design parameter in the use of the ridge regression method.

The present invention is described herein with reference to certain embodiments. Other embodiments are possible. Accordingly, the present invention should not be limited to the embodiments disclosed herein.

We claim:

1. A method of performing integrity monitoring comprising the steps of:
    selecting at least one ranging measurement associated with a first ranging source belonging to a first ranging source type;
    selecting at least one ranging measurement associated with a second ranging source belonging to a second ranging source type; and
    performing failure detection using the selected ranging measurements associated with the first and second ranging sources to determine whether either of the first or second ranging sources failed, wherein at least one ranging source type comprises a satellite system and at least one ranging source type comprises a land-based wireless communication network and wherein the ranging measurement associated with the first or second ranging source comprises one of a PN phase offset measurement, a pilot phase offset measurement of a pilot signal transmitted by the first or second ranging source, a signal strength measurement of a signal transmitted by the first or second ranging source, a round trip delay between a receiver and the first or second ranging source, a one way delay between a receiver and the first or second ranging source, or an enhanced observed time difference between a receiver and the first or second ranging source.

2. The method of claim 1, wherein failure detection is performed using weighted ridge regression techniques.

3. The method of claim 1 or 2 comprising the additional step of:
    performing failure detection using the selected ranging measurements associated with the first and second ranging sources.

4. The method of claim 1 or 2 comprising the additional step of: performing failure isolation using the selected ranging measurements.

5. A method of performing integrity monitoring comprising the steps of:
    extracting ranging measurements from ranging sources belonging to at least two ranging source types;
    selecting ranging measurement from the extracted ranging measurements; and
    performing failure detection using the selected ranging measurements to determine whether any of the ranging sources failed, wherein at least one ranging source type comprises a satellite system and at least one ranging source type comprises a land-based wireless communication network and wherein the ranging measurement associated with the first or second ranging source comprises one of a PN phase offset measurement, a pilot phase offset measurement of a pilot signal transmitted by the first or second ranging source, a signal strength measurement of a signal transmitted by the first or second ranging source, a round trip delay between a receiver and the first or second ranging source, a one way delay between a receiver and the first or second ranging source, or an enhanced observed time difference between a receiver and the first or second ranging source.

6. The method of claim 5 comprising the additional step of:
    performing failure isolation using the selected ranging measurements.

7. The method of claim 5, wherein failure detection is performed using weighted ridge regression techniques.

8. The method of claim 5, 6 or 7, wherein all the extracted ranging measurements are selected.

9. The method of claim 5, 6 or 7, wherein the step of selecting ranging measurements comprises the steps of:
    selecting ranging measurements associated with a first ranging source from the extracted ranging measurements; and
    selecting ranging measurements associated with a second ranging source from the extracted ranging measurements if the selected ranging measurements associated with the first ranging source is insufficient to perform failure detection or failure isolation.

10. The method of claim 5, 6 or 7, wherein the step of selecting ranging measurements is based on perceived reliability associated with each of the extracted ranging measurements.

* * * * *